United States Patent

Nomura et al.

Patent Number: 5,615,854
Date of Patent: Apr. 1, 1997

[54] CAMERA STAND

[75] Inventors: Atsushi Nomura; Takashi Nakamura, both of Sakado, Japan

[73] Assignee: Nippon Control Industrial Co., Ltd., Saitama, Japan

[21] Appl. No.: 407,667

[22] Filed: Mar. 21, 1995

[30] Foreign Application Priority Data

Nov. 10, 1994 [JP] Japan .................................. 6-301492

[51] Int. Cl.$^6$ ................................................ E04G 3/00
[52] U.S. Cl. ................................ 248/287.1; 248/205.3; 248/220.22; 248/918
[58] Field of Search ........................... 248/287.1, 205.3, 248/276.1, 918, 285.1, 286.1, 220.22, 223.41, 224.7, 225.11, 500, 510

[56] References Cited

U.S. PATENT DOCUMENTS

| | | | |
|---|---|---|---|
| D. 339,149 | 9/1993 | Nakamura et al. | D16/202 |
| 362,124 | 5/1887 | Thompson et al. | |
| 937,480 | 10/1909 | Smith et al. | |
| 3,533,583 | 10/1970 | Azim | 248/287.1 |
| 3,955,788 | 5/1976 | Delage | 248/298.1 |
| 4,033,539 | 7/1977 | Bardocz | 248/287.1 |
| 4,177,967 | 12/1979 | Marchus | 248/229.1 |
| 4,946,121 | 8/1990 | Troke | 248/205.3 |
| 5,119,203 | 6/1992 | Hosaka et al. | 358/229 |
| 5,323,992 | 6/1994 | Sifers et al. | 248/205.3 |
| 5,374,971 | 12/1994 | Clapp et al. | 354/293 |

*Primary Examiner*—Derek J. Berger
*Assistant Examiner*—Anita M. King
*Attorney, Agent, or Firm*—Wenderoth, Lind & Ponack

[57] ABSTRACT

To image not only the user in front of a camera but also documents situated below, a rail member is vertically attached to a sidewall of a display case, a slide rod fixing clamp is slidably mounted on the rail member, a slide rod is transversely displaceably mounted on the slide rod fixing clamp, an orthogonal rod is secured to slide rod, and a camera mounting clamp is mounted on the orthogonal rod in such a manner that it is rotatable around the orthogonal rod. Thus, a camera can be positioned lower than in the instance where it is disposed on top of a display. Also, the camera can be directed downward by virtue of the camera mounting clamp.

7 Claims, 7 Drawing Sheets

CAMERA STAND

BACKGROUND OF THE INVENTION

1. Field of the Invention

The present invention relates to a camera support or stand for mounting thereon an image input camera (CCD camera) for use in a desktop type video conference system.

2. Description of the Related Arts

In recent years a video conference system has evolved on the basis of personal computers or workstations, with cameras utilizing CCD's (charge coupled devices) for image inputs. The cameras are mounted on top of displays to input visual images of users' faces for the transmission to the other parties.

Due to the mounting on top of the displays, these desktop type video conference cameras are situated slightly above heads of persons sitting in front of the displays, and hence are at all times limited to producing downcast images of faces of the users since they directly view the monitors or keyboards. Such downcast images will make unfavorable impressions on the other parties viewing them.

As measures against this, the present applicant previously proposed a camera stand to ensure a provision of images of favorably directed faces without downcast eyes. The camera stand comprises a rail member longitudinally extending on the lateral side of a display case, and a slide body slidably mounted on the rail member and having a stop to allow the slide body to be retained at an appropriate point on the rail member. The camera is mounted on the thus constructed slide body, whereby the position of the camera can be lowered as compared with the case disposed on top of the display.

At the video conferences, however, it is often desired that not only persons but also documents on desks be transmitted in the form of images. The camera associated with the invention proposed by the present applicant is inconveniently incapable of transmitting the document images, which will necessitate an additional camera dedicated to the on-desk documents. Thus, two cameras need to be provided, resulting in a costly set.

SUMMARY OF THE INVENTION

It is therefore the object of the present invention to provide a camera stand or support which is capable of displacing a camera mounted thereon so as to allow not only persons but also documents to be imaged.

According to an aspect of the present invention, there is provided a camera stand or support including a rail member fastened to a part to be attached, a slide rod fixing clamp slidably displaceable on the rail member, a slide rod fitted into the slide rod fixing clamp, an orthogonal rod secured to the slide rod, and a camera mounting clamp provided on the orthogonal rod for mounting a camera thereon.

The rail member has at its back an adhesive layer for the adhesion onto a display case. The slide rod includes given angle compensation grooves extending axially thereof, and the slide rod fixing clamp includes retaining protrusions to be engaged with the given angle compensation grooves. The orthogonal rod includes level confirmation lines extending axially thereof. The camera mounting clamp includes lines. The orthogonal rod includes knurls formed axially thereof. The camera mounting clamp includes tilt means allowing full-rotations and vertical swings within a predetermined range of angles. The slide rod may have a cylindrical shape.

Thus, by vertically moving the slide rod fixing clamp over the rail member, the camera mounting clamp bearing a camera thereon can be vertically shifted. By loosening the slide rod fixing clamp to transversely slidably move the slide rod, the camera mounting clamp bearing a camera thereon can be transversely shifted. By turning the camera mounting clamp on the orthogonal rod, the direction of the camera can be rotated 360 degrees around the orthogonal rod.

Through the adhesive layer provided on the back of the rail member, the camera stand is rigidly fixed to the case of the display. The slide rod and the orthogonal rod secured thereto can be constantly kept at a predetermined angle with respect to the rail member, by the provisions of the given angle compensation grooves formed in the slide rod and the retaining protrusions of the slide rod fixing clamp to be engaged with the given angle compensation grooves. The orthogonal rod is provided with level confirmation lines enabling the state of level to be visually observed. The lines formed on the camera mounting clamp ensure visual observations of angles with respect to the orthogonal rod. The knurls formed on the orthogonal rod provide moderate rotations and positive locking of the camera mounting clamp. The provision of the tilt means on the orthogonal rod allows the camera to be swung and rotated. With a cylindrical slide rod, the orthogonal rod and the tilt means can be rotated around the slide rod and retained at an angle.

BRIEF DESCRIPTION OF THE DRAWINGS

These and other objects, advantages and features of the present invention will become apparent to those skilled in the art from the following detailed description of the preferred embodiments thereof when read in light of the accompanying drawings, in which.

DETAILED DESCRIPTION OF THE PREFERRED EMBODIMENTS

An embodiment of the present invention will now be described with reference to the accompanying drawings in which like elements are referenced by like numerals. Referring first to FIGS. 1 to 6, a camera stand or support generally designated at 1 is fitted to a case 101 of a display 100. The camera stand 1 comprises an elongated rail member 2. The rail member 2 has a couple of shoulders 2a and 2b formed on its back along edges thereof and longitudinally extending in parallel with each other. The back of the rail member 2 is provided with an adhesive layer 3 adhered on the side of the display case 101 to be adhered. It will be appreciated that the adhesive layer 3 is protected by a released paper previous to adhesion.

A slide rod fixing clamp 4 has at its base an engagement groove 5 and is slidably mounted on the rail member 2 with the engagement groove 5 engaged with the shoulders 2a and 2b of the rail member 2. A resistance means not shown is provided within the engagement groove 5 in order to retain the slide rod fixing clamp 4 at an appropriate position on the rail member 2. The resistance means may be formed of, for example, a metallic leaf spring which presses the rail member 2 with a predetermined pressing force to provide a predetermined frictional resistance, thereby retaining the slide rod fixing clamp 4 on the rail member 2. The slide rod fixing clamp 4 is displaceable by manually applying thereto a force exceeding the frictional resistance of the resistance means, thus ensuring alterations in the retaining position of the slide rod fixing clamp 4.

The slide rod fixing clamp 4 includes a pair of clamping sections 7a and 7b defining in the middle thereof a transversely extending through-hole 6 for receiving a slide rod 11. The clamping sections 7a and 7b have at their ends a clamp screw 8. To unclamp or clamp the slide rod 11, the clamp screw 8 is turned to alter the diameter of the through-hole 6.

The through-hole 6 of the slide rod fixing clamp 4 is provided with a pair of retaining protrusions 10a and 10b intended to be fitted into a pair of given-angle compensation grooves 12a and 12b, respectively, which will be described later, of the slide rod 11.

The slide rod 11 is a round bar having the pair of axially extending given-angle compensation grooves 12a and 12b. The slide rod 11 is inserted into the through-hole 6 formed in the slide rod fixing clamp 4 while bringing the given-angle compensation grooves 12a and 12b into engagement with the retaining protrusions 10a and 10b, respectively. This will prevent the slide rod 11 from being rotated. An orthogonal rod 13 is secured to the slide rod 11 at right angles therewith.

The outer periphery of the orthogonal rod 13 is provided with axially extending knurls 14 and also axially extending level confirmation lines 15a and 15b. The knurls 14 ensure a moderate rotation of a camera mounting clamp 16 described later as well as a positive locking thereof. The level confirmation lines 15a and 15b provide not only a confirmation that the orthogonal rod 13 is brought to a level with the rail member 2 upright positioned along the sidewall of the display 100 but also a measure for visually checking a setting angle of the camera mounting clamp 16.

The camera mounting clamp 16 includes a pair of clamping sections 18a and 18b defining in the middle thereof a throughhole 17 for receiving the orthogonal rod 13. The clamping sections 18a and 18b have a clamp screw 19 to alter the diameter of the through-hole 17. By tightening up the clamp screw 19, the camera mounting clamp is rigidly fixed to the orthogonal rod 13.

The camera mounting clamp 16 further includes on its top a mounting screw 21 for mounting a camera 24 thereon, and a tilt device 22 allowing both full-rotations around the mounting screw 21 and vertical swings within a predetermined range of angles (capable of being arbitrary directed or angled to predetermined directions or angles). The tilt device 22 has been already filed as Japanese Patent Application No. 294187/93. The clamping sections 18a and 18b of the camera mounting clamp 16 are provided with lines 23a and 23b, respectively, allowing visual observations of angles with the level confirmation lines 15a and 15b, respectively.

Description will now be given of a manner of mounting the camera stand 1 onto the display case 101 to be mounted in the above-described construction. The rail member 2 is first attached vertically to the sidewall of the display case 101 by means of the adhesive layer 3. Then, the slide rod fixing clamp 4 is mounted on the rail member 2 by fitting the shoulders 2a and 2b of the rail member 2 into the engagement groove 5 of the slide rod fixing clamp 4. The slide rod fixing clamp 4 is vertically displaced and retained in position. Thereafter, the slide rod 11 is inserted into the through-hole 6 of the slide rod fixing clamp 4. The camera-mounting clamp 16 is then mounted on the orthogonal rod 13 secured to the slide rod 11. Afterwards, the camera 24 is mounted on the camera mounting clamp 16 by means of the mounting screw 21.

Subsequently, in order to direct the camera 24 toward an optimum direction, the camera stand 1 undergoes vertical adjustments of the slide fixing clamp 4, transverse adjustments of the slide rod 11, adjustments of the camera mounting clamp 16, and final adjustments through the tilt device. It is to be appreciated that the camera mounting clamp 16 is visually adjusted through angles of the lines 23a and 23b with the level confirmation lines 15a and 15b formed on the orthogonal rod 13.

In this manner, the camera 24 is so adjusted in direction that it is positioned in front of and confronts the user so as to look up at him or her, thereby producing preferable images of the face of the user as compared with the images viewed from above in the prior art.

Figure 1:
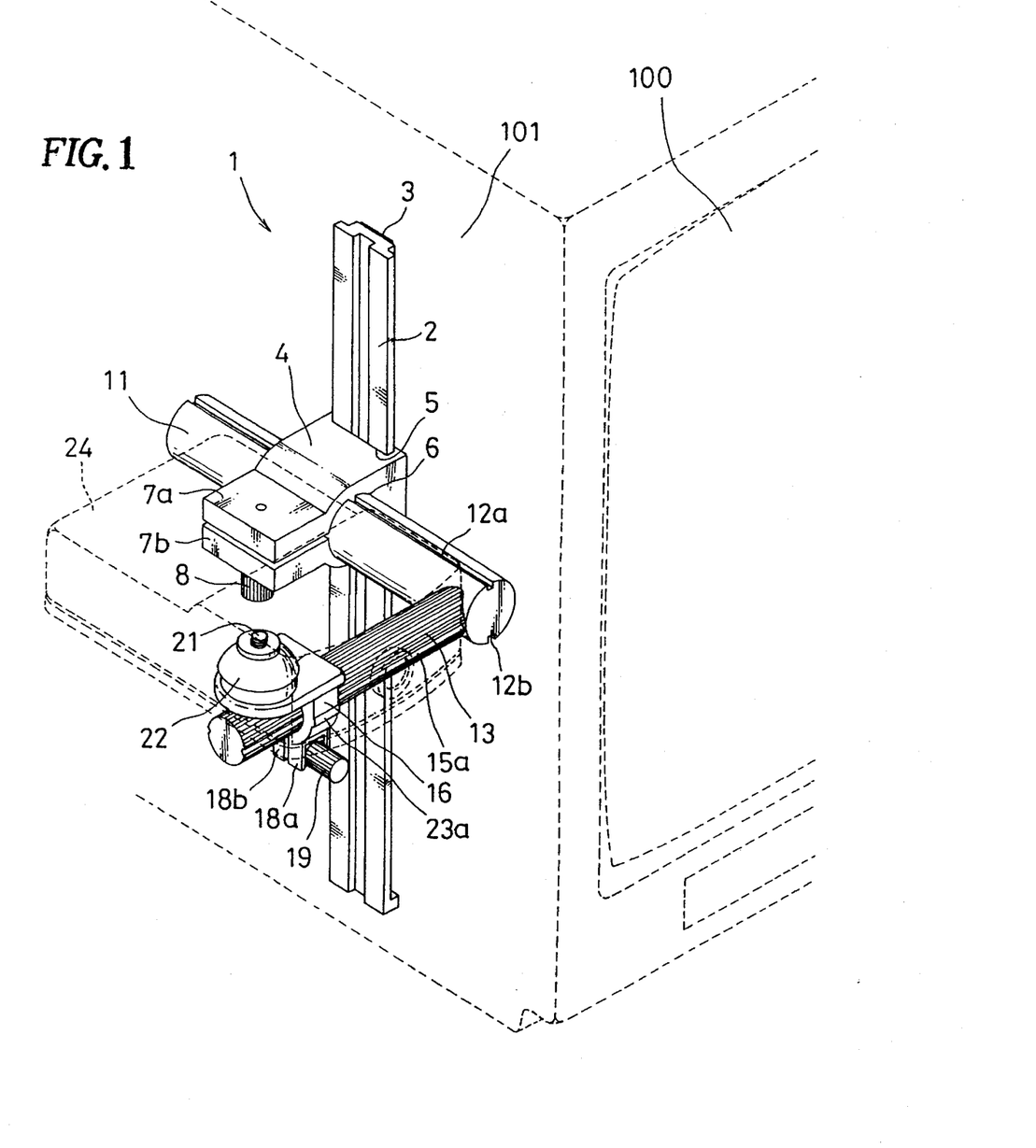
FIG. 1 is a perspective view of a camera stand constructed in accordance with a first embodiment of the present invention.
Figure 2:
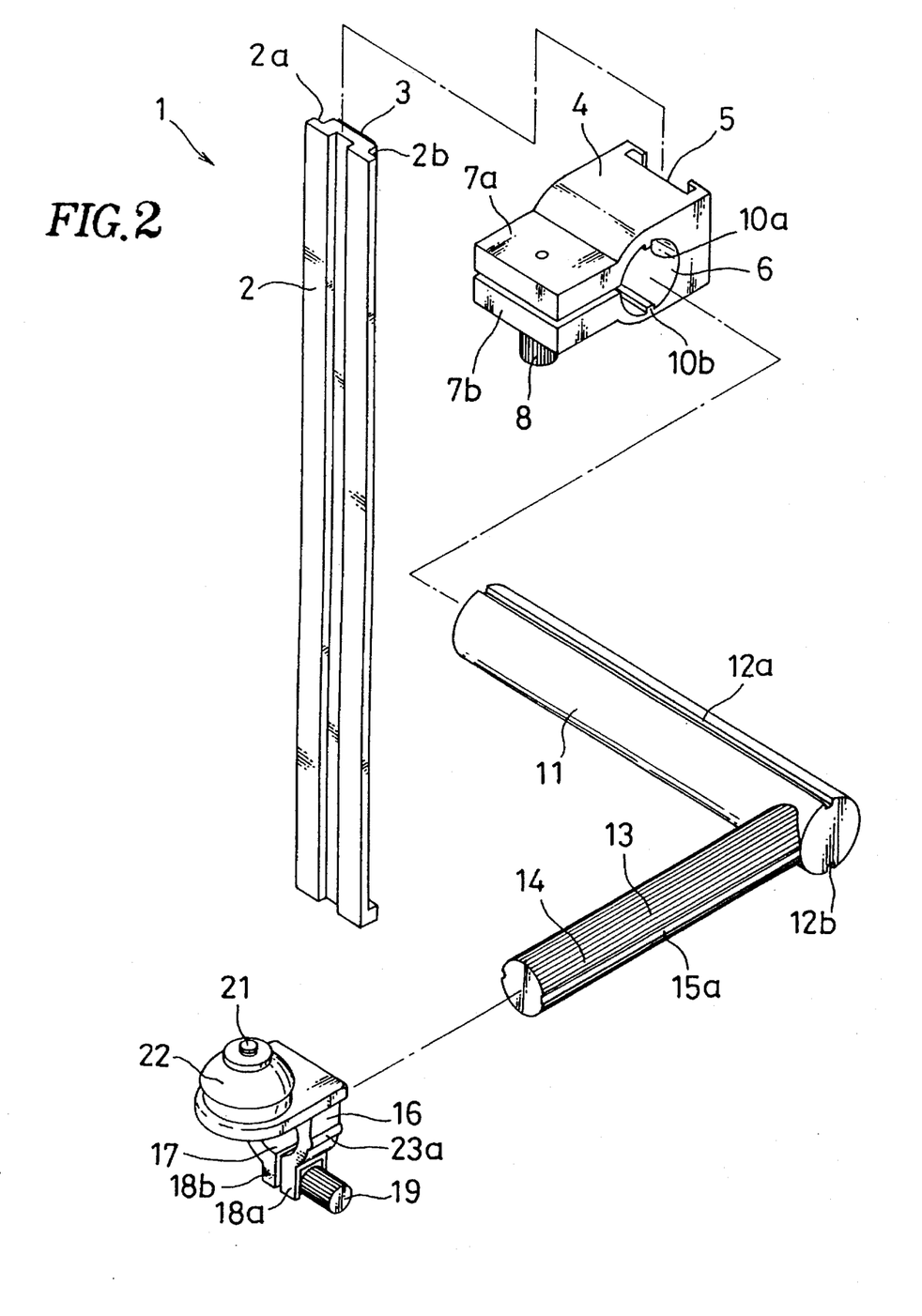
FIG. 2 is an exploded perspective view of the camera stand according to the first embodiment of the present invention.
Figure 3:
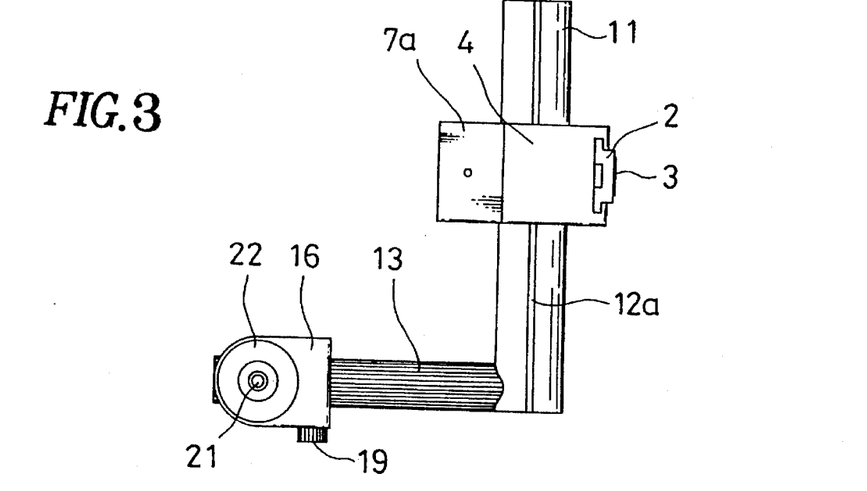
FIG. 3 is a top plan view of the camera stand according to the first embodiment of the present invention.
Figure 4:
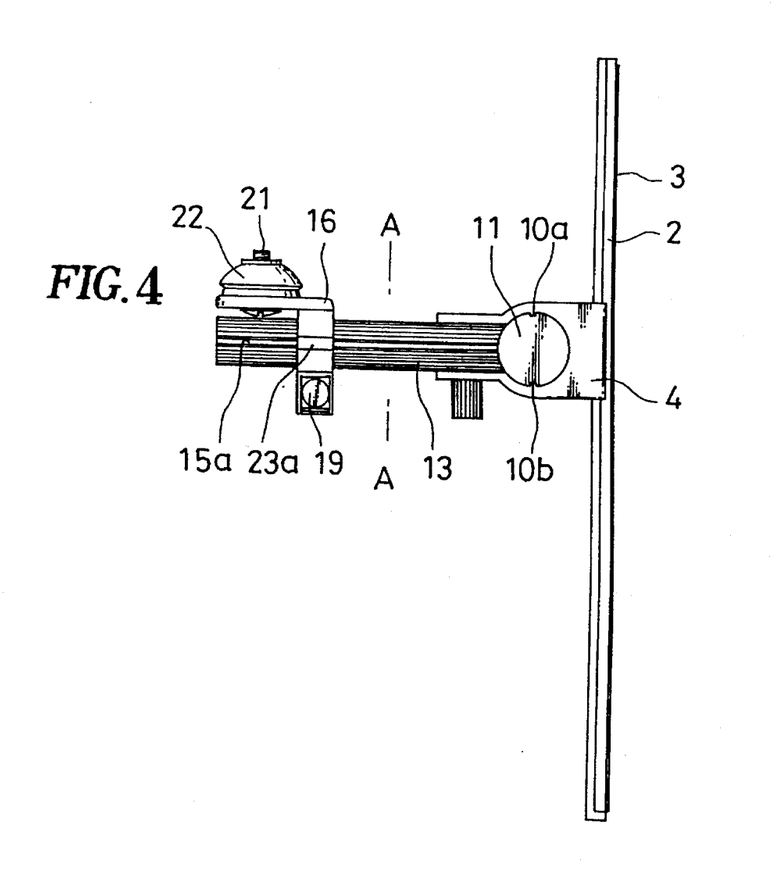
FIG. 4 is a front view of the camera stand according to the first embodiment of the present invention.
Figure 5:
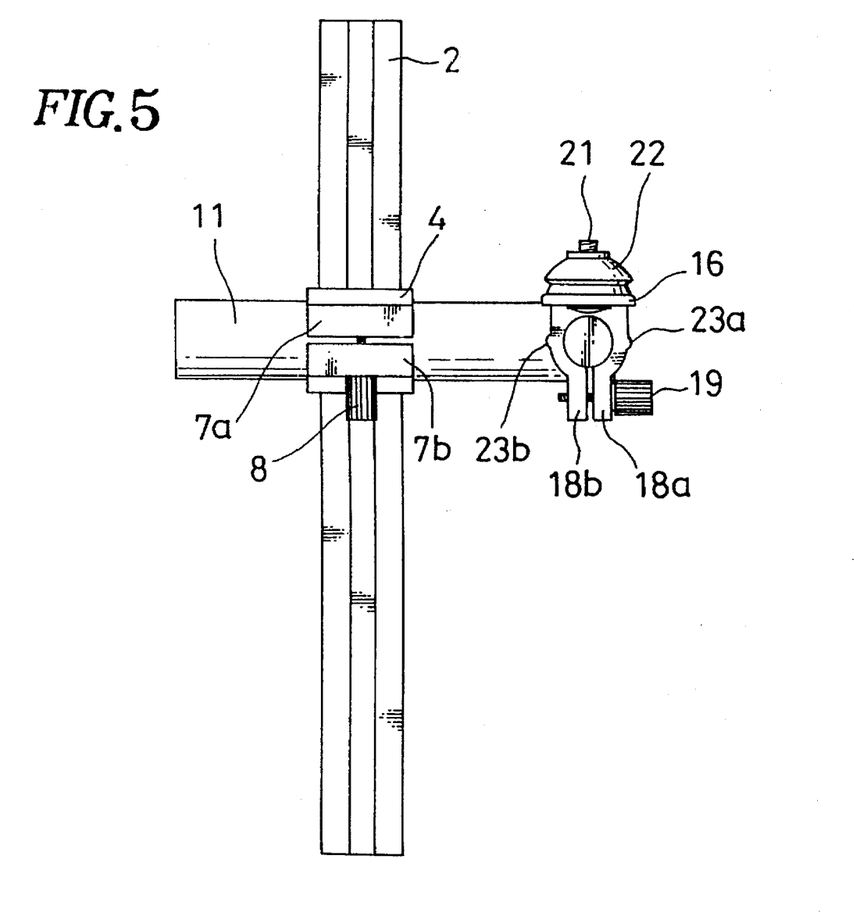
FIG. 5 is a side elevation view of the camera stand according to the first embodiment of the present invention.
Figure 6:
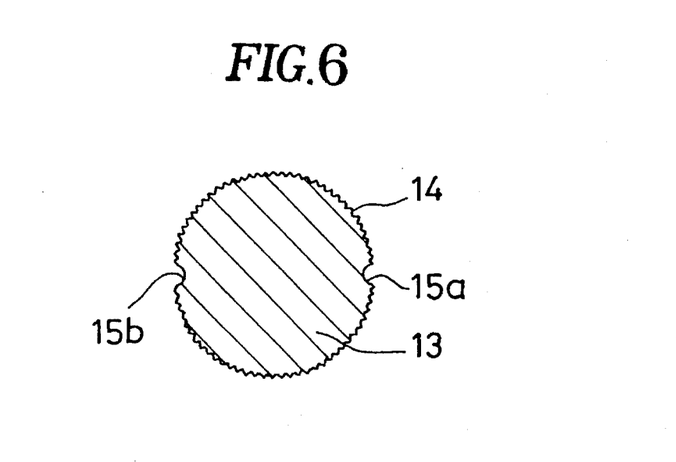
FIG. 6 is an end view taken along a line A—A of FIG. 4.
Figure 7:
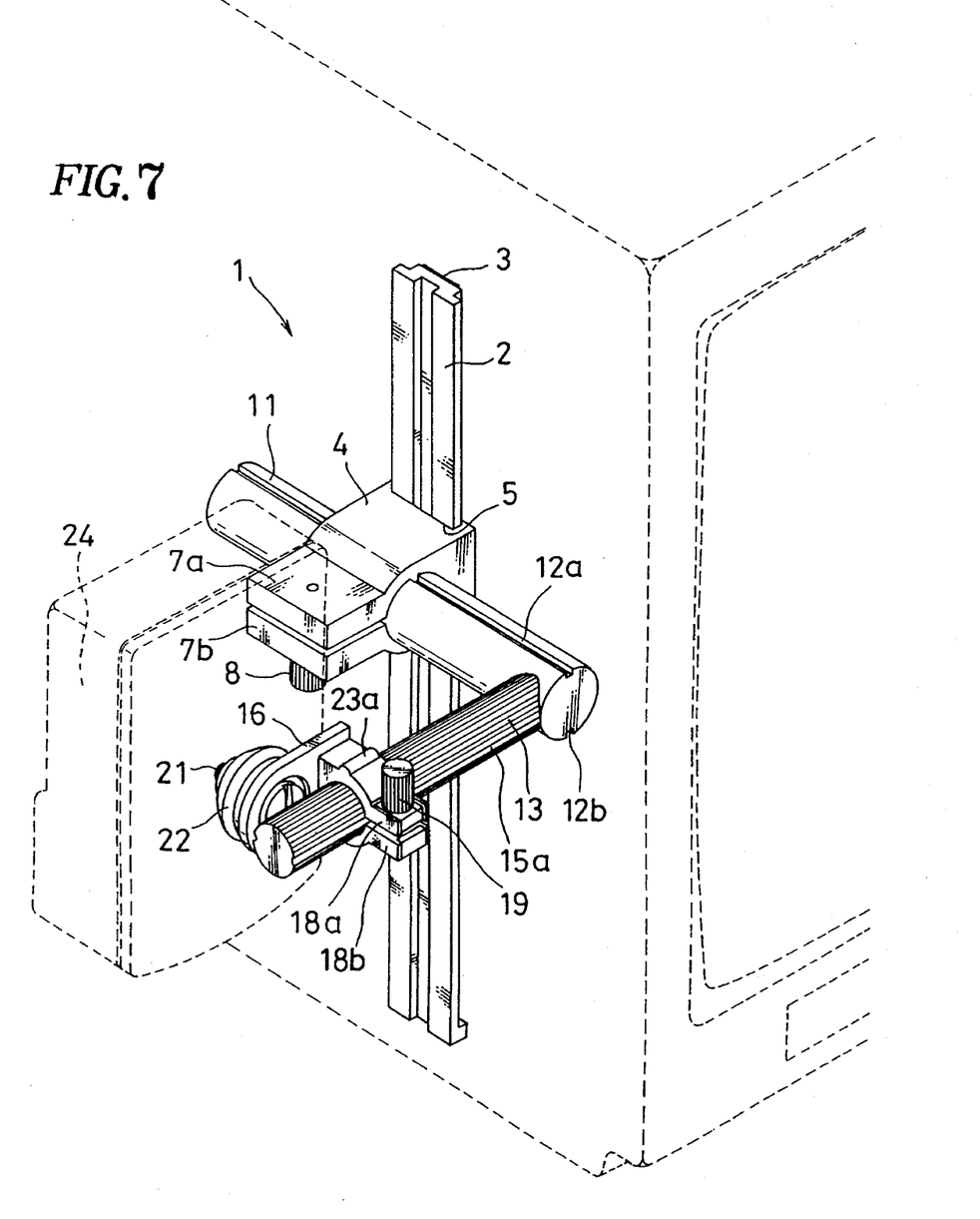
FIG. 7 is a perspective view showing the camera directed downward.

Also, the camera stand 1 may be applied to a camera for imaging documents. In this case, the mounting screw 19 is loosened to rotate the camera mounting clamp 16 by 90 degrees around the orthogonal rod 13 from the state shown in FIG. 1. This results in the state of the camera 24 shown in FIG. 7 enabling its lens to be directed downward. In order to allow the lens to directly confront the documents, the slide rod fixing clamp 4 may be possibly loosened to transversely displace the slide rod 11 for positional adjustments of the camera 24. This may be also attended with micro-adjustments by the tilt device 22. Thus, the documents lying on the desk can appear on the display 100.

Figure 8:
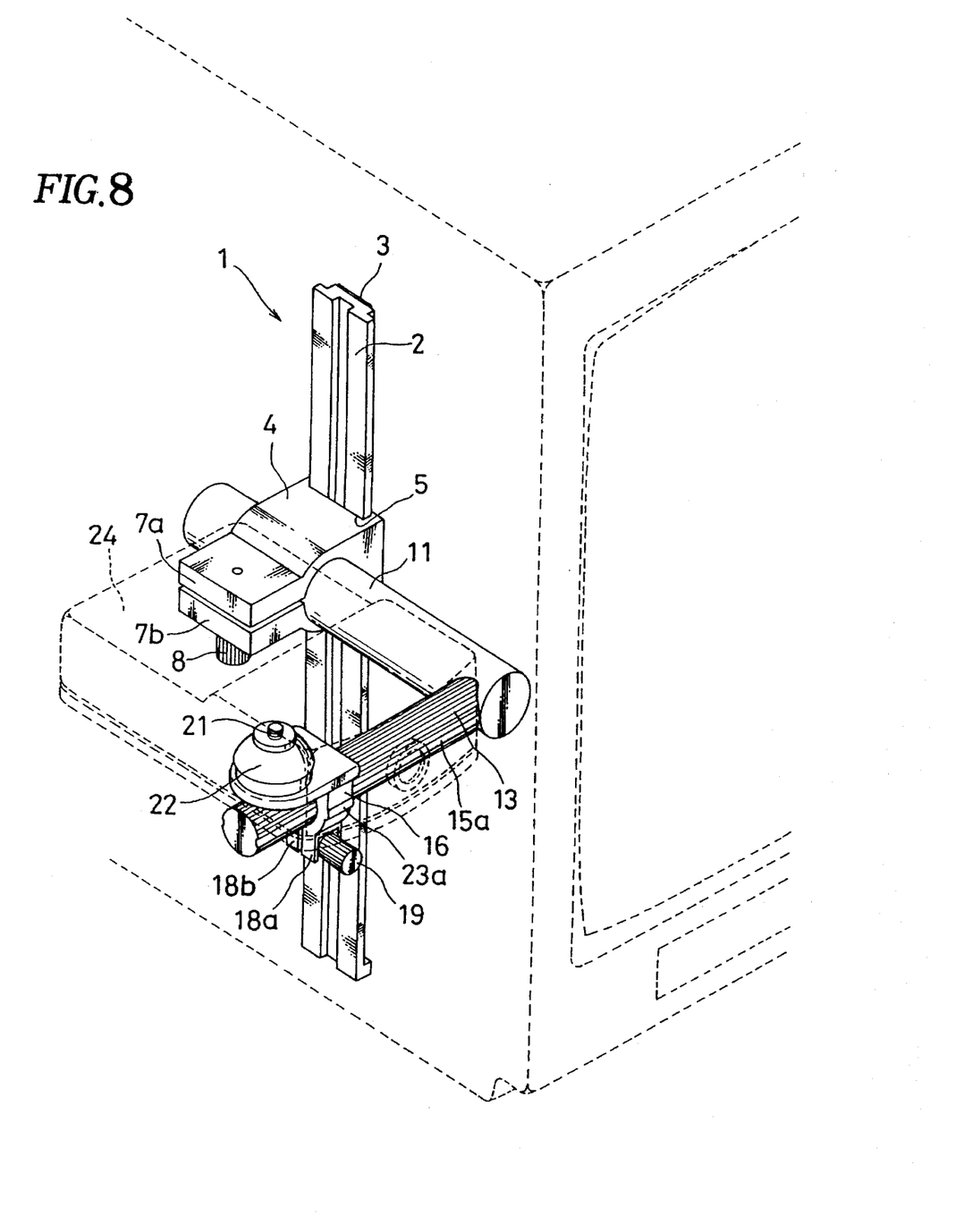
FIG. 8 is a perspective view of a camera stand constructed in accordance with a second embodiment of the present invention.
Figure 9:
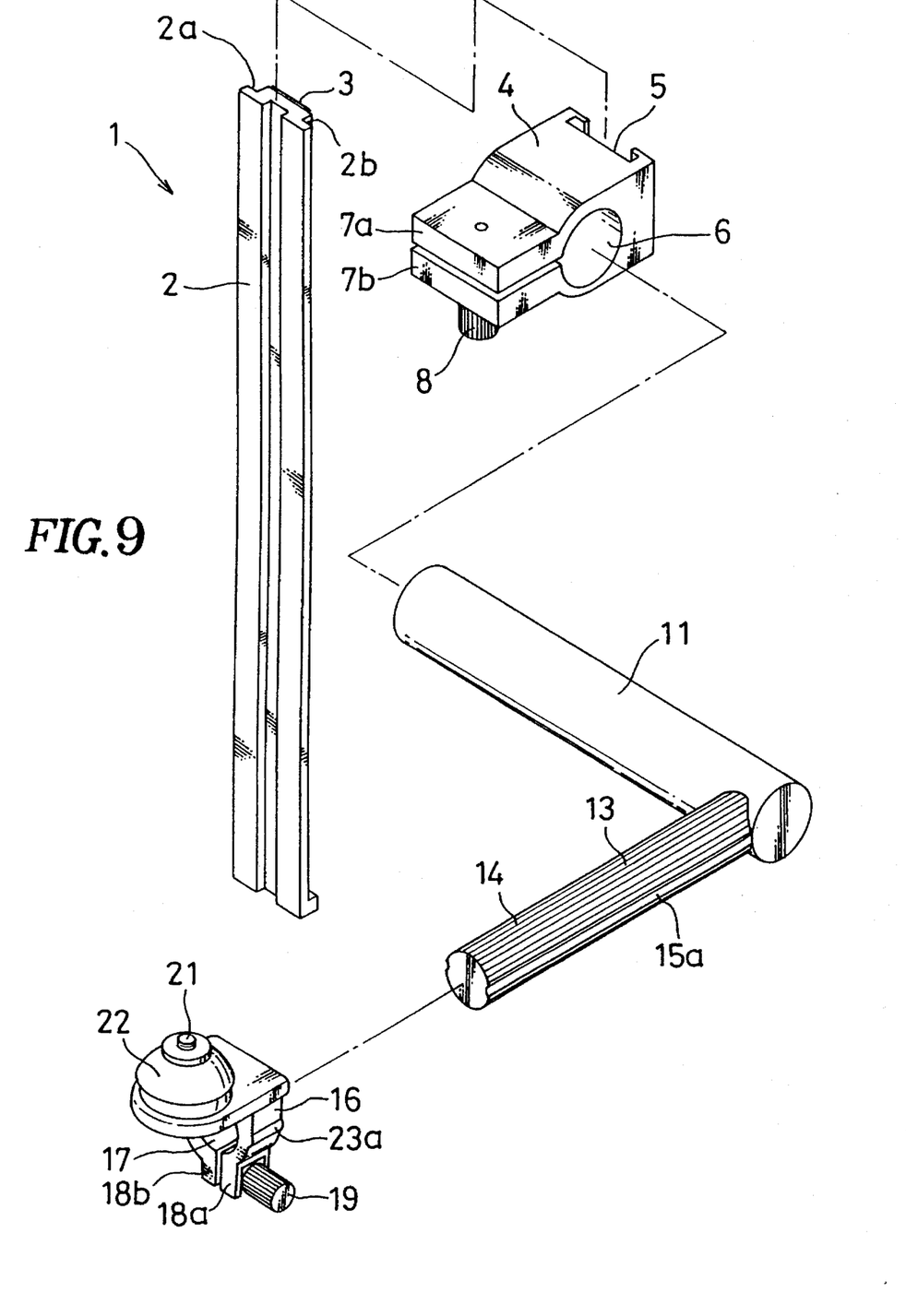
FIG. 9 is an exploded perspective view of the camera stand according to the second embodiment of the present invention.

Referring to FIGS. 8 and 9, there is depicted another embodiment. Although the above embodiment is disclosed including the slide rod 11 provided with the given angle compensation grooves 12a and 12b, this embodiment employs a slide rod 11 of a simple cylinder free from the given angle compensation grooves 12a and 12b. Correspondingly, the slide rod fixing clamp 4 has no engagement protrusions 10a and 10b. This means that the slide rod 11 is retained only with a clamping force of the clamping sections 7a and 7b. Nevertheless, the camera 24 is fixed in position since the clamping force of the clamping sections 7a and 7b overcomes a rotational moment exerted on the slide rod 11 by the weight of the camera 24. This may result in a less reliability on the rotational moment exerted on the slide rod 11 by the weight of the camera 24 as compared with the above embodiment, but will ensure an increased degree of freedom in setting the position and direction of the camera 24 due to free setting of angles of the orthogonal rod 13 and the tilt device 22 around the slide rod 11.

The other elements are substantially the same as the above embodiment, and hence are designated by the common reference numerals to omit the description thereof. According to the present invention, as described above, the slide rod fixing clamp is displaced along the rail member to vertically shift the camera mounting clamp bearing the camera thereon, while the slide rod fixing clamp is loosened to transversely shift the slide rod, whereby the camera mounting clamp bearing the camera thereon can be freely displaced in vertical and transverse directions. In addition, the camera mounting clamp is capable of being rotated around the orthogonal rod, allowing a production of images of not only the user's face but also the documents lying on the desk. For the images of the user's face, the camera is allowed to be positioned in front of and confront the user so as to look up at him or her, thereby providing preferable images.

Further, the rail member can be readily attached to the sidewall of the display case with the aid of the adhesive layer, and the retaining protrusions of the slide rod fixing clamp to be engaged with the given angle compensation grooves formed in the slide rod serve to keep at all times the slide rod and the orthogonal rod at a predetermined angle with the rail member.

Moreover, the level confirmation lines provided in the orthogonal rod enable the state of level to be visually observed. The lines of the camera mounting clamp provide visual observations of angles thereof with respect to the orthogonal rod.

Also, the knurls formed on the orthogonal rod ensure moderate rotations and positive locking of the camera mounting clamp, and the tilt device provided on the camera mounting clamp allows the camera to swing and rotate around the mounting screw.

Furthermore, the cylindrical shape of the slide rod allows rotations of the tilt means around the slide rod, with the result that the camera can be retained at an angle.

It will be understood by those skilled in the art that a number of variations and modifications may be made in the present invention without departing from its spirit and scope. Accordingly, the foregoing description is to be construed as illustrative only rather than limiting. The present invention should only be taken as limited by the following claims.

What is claimed is:

1. A camera support comprising:
    a rail member mountable on a vertical surface;
    a clamp slidably mounted on said rail member;
    a first rod slidably received in said clamp, wherein said first rod is movable along a line corresponding to a central longitudinal axis of said first rod, and can be fixed in a stationary position by said clamp;
    a second rod connected to said first rod so as to extend orthogonally from said first rod; and
    a camera mounting clamp which includes a tilt means and is slidably and rotatably attached to said second rod, wherein said camera mounting clamp can be fixed in a stationary location by clamping said second rod, and said tilt means allows full rotations of a camera about an axis perpendicular to said second rod and limited vertical swings of the camera about an axis parallel to a longitudinal axis of said second rod.

2. The camera support as claimed in claim 1, further comprising an adhesive layer of material provided on said rail member for mounting said rail member on a support surface.

3. The camera support as claimed in claim 1, wherein said first rod includes axially extending grooves formed in an outer peripheral surface thereof, and said clamp mounted on said rail member includes retaining protrusions engagable with said grooves to prevent said first rod from rotating due to a moment produced by a camera mounted on said camera support.

4. The camera support as claimed in claim 1, wherein said second rod includes level confirmation lines extending axially thereof, and said camera mounting clamp includes lines for visually adjusting, relative to said level confirmation lines, a horizontal position of a camera mounted on said camera support.

5. The camera support as claimed in claim 1, wherein said second rod has a knurled outer peripheral surface for increasing friction between said second rod and said camera mounting clamp.

6. The camera support as claimed in claim 1, wherein said first rod is cylindrical in shape and has a smooth outer surface.

7. The camera support as claimed in claim 1, wherein said second rod is cylindrical, and said camera mounting clamp engages an outer peripheral surface of said second rod and can be fixed at any position around a central longitudinal axis of said second rod.

* * * * *